(12) United States Patent
Adolphsen

(10) Patent No.: US 8,578,832 B2
(45) Date of Patent: Nov. 12, 2013

(54) MUZZLE BRAKE AND SUPPRESSOR ARTICLE

(75) Inventor: Alan Adolphsen, Hope, ME (US)

(73) Assignee: Teludyne Tech Industries, Inc., Greenville, SC (US)

( * ) Notice: Subject to any disclaimer, the term of this patent is extended or adjusted under 35 U.S.C. 154(b) by 0 days.

(21) Appl. No.: 12/973,053

(22) Filed: Dec. 20, 2010

(65) Prior Publication Data

US 2011/0174141 A1 Jul. 21, 2011

Related U.S. Application Data

(63) Continuation-in-part of application No. 12/774,402, filed on May 5, 2010.

(60) Provisional application No. 61/176,200, filed on May 7, 2009, provisional application No. 61/230,450, filed on Jul. 31, 2009, provisional application No. 61/287,785, filed on Dec. 18, 2009.

(51) Int. Cl.
*F41A 21/00* (2006.01)

(52) U.S. Cl.
USPC .......................................................... 89/14.3

(58) Field of Classification Search
USPC ........... 89/14.05, 14.1, 14.2, 14.3, 14.4, 14.5; 42/79
See application file for complete search history.

(56) References Cited

U.S. PATENT DOCUMENTS

| | | | | |
|---|---|---|---|---|
| 1,605,393 A * | 11/1926 | Cutts, Jr. | ......................... | 89/14.3 |
| 2,667,815 A * | 2/1954 | Strong | ............................. | 89/14.3 |
| 3,368,453 A * | 2/1968 | Shaw | .............................. | 89/14.3 |
| 5,092,223 A * | 3/1992 | Hudson | ........................... | 89/14.2 |
| 7,032,339 B1 * | 4/2006 | Bounds | ........................... | 42/1.06 |
| 7,073,426 B1 * | 7/2006 | White | ............................. | 89/14.4 |

\* cited by examiner

*Primary Examiner* — Gabriel Klein
(74) *Attorney, Agent, or Firm* — McNair Law Firm, P.A.; Douglas W. Kim; Douglas L. Lineberry

(57) ABSTRACT

This invention is directed to a muzzle brake that can be attachably connected to a weapon system having a barrel comprising: a housing; a front opening defined in the housing having a diameter generally the same size as the caliber of the barrel to which the housing can be attached; an impact plane included in the housing having an angle of incident greater than 90 degrees defined between the impact plane and the longitudinal axis of the housing; an eddy plane included in the housing having an angle of incident defined between the eddy plane and the longitudinal axis of the housing that is greater than the incident of angle of the impact plane; and, a concave surface included in the housing and carried by the eddy plane; a forward port defined by the impact plane, eddy plane and concave surface in the housing so that a portion of the gas expelled from the barrel is deflected outward from the housing upon contacting the impact plane and a portion of the gas expelled from the barrel is deflected by the concave surface producing eddies in the deflected gas stream.

21 Claims, 10 Drawing Sheets

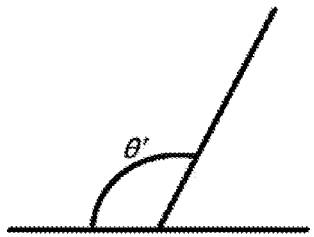
Fig 2C          Fig 2D
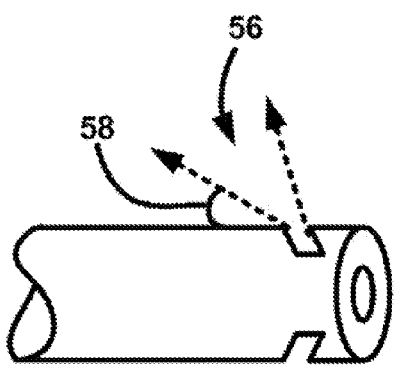
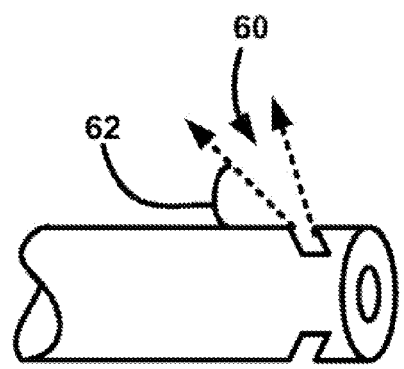
Fig 2E          Fig 2F
Prior Art

MUZZLE BRAKE AND SUPPRESSOR ARTICLE

CLAIM OF PRIORITY

This application is a non-provisional of and claims priority on U.S. Provisional Patent Application 61/287,785 filed Dec. 18, 2009 titled Muzzle Brake. This application is also a continuation-in-part of and claims priority on U.S. patent application Ser. No. 12/774,402 filed May 5, 2010 titled Weapon System Construction and Modification which, in turn, is a non-provisional application of and claims priority on U.S. Provisional Patent Applications 61/176,200; 61/230,450 and 61/287,785, all of which are incorporated by reference.

BACKGROUND OF THE INVENTION

1. Field of the Invention

This invention is directed to a firearm or weapon system that can include a barrel. More specifically, this invention is directed to a new and novel muzzle brake and brake suppressor assembly design and construction taking advantage of expanding gases of a propellant to create eddies in the resulting expelled gas stream.

2. Description of the Related Art

When a projectile is forced through a rifle, pistol or weapon system barrel, the pressure results in the projectile traveling in one direction while force is applied to the barrel in an opposite direction. In some circumstances, this force is called "kick" or "recoil". The resulting force causes the barrel to come off target thereby requiring the barrel to be placed back on target for a subsequent firing. This effect is sometimes known as "barrel flip." Further, the greater this force, the more physical strain is placed on the shooting platform. One need only fire a high-powered rifle from the shoulder in a standing position to appreciate the physical force associated with these forces.

One method of reducing this force is to use a heavy barrel or otherwise use a heavy shooting platform. Based upon the familiar law of motion, an object at rest stays at rest and an object in motion stays in motion with the same speed and in the same direction unless acted upon by an unbalanced force. Further, the tendency of an object to resist changes in its state of motion varies with mass. A more massive object has a greater tendency to resist changes in its state of motion. However, there are obvious disadvantages with increasing the mass weight such as the detrimental effect on weight, size, cost, portability, and materials used.

Another method is to reduce the energy in the propellant thereby generating less expanding gas. The disadvantages are obvious. Reducing the energy of the propellant detrimentally affects the accuracy of the projectile since the range of the projectile is shortened and a higher trajectory may be needed to hit some distance target. The projectile itself may have to be lighter resulting in a less effective impact for the projectile. Further, some firearms such as semi-automatics and automatics will not properly function unless sufficient "blow-back" or recoil exists to cycle the next projectile, cartridge, round or the like.

There have been many attempts to reduce the kick. For example, U.S. Pat. No. 5,357,842 illustrates a muzzle break with several ports that allow the expanding gas to escape through the sides of a barrel so that less force is directed opposite the projectile thereby reducing the kick. U.S. Pat. No. 4,207,799 shows a similar design where the ports are located on the top of the barrel to help prevent the barrel from moving upwards. The top ported barrels are typically used for pistols. Further, large muzzle brakes are used on cannons, such as those mounted on tanks, to reduce the recoil associated with these extremely high-powered projectiles. Examples of attempts to manufacture effective muzzle brakes for cannons include U.S. Pat. Nos. 7,600,461; 6,578,462; 5,119,716 and 2,778,278. However, each of these muzzle brakes, due to disadvantageous designs, include ports that are uniform and of a linear nature so that the expanding gas travels through the ports generally linearly, even when the ports themselves are not perpendicular to the bore of the barrel.

Additional attempts have been made to attached suppressors to the ends of barrels to reduce the noise made by firearms or weapon systems. One of the first attempts is shown in U.S. Pat. No. 880,386 issued in 1908 that uses baffle technology. The use of baffles has continued as shown in U.S. Pat. No. 6,575,074 which includes baffles which are uniform throughout the suppressor. This uniformity is further shown in U.S. Pat. No. 5,164,535 which includes disk shaped baffles. U.S. Pat. No. 5,679,916 also includes those previous disadvantages. Since suppressors generally slow down the projectile and add weight to the end of the barrel, suppressors can assist with reducing recoil.

Generally, suppressors function with the series of baffles which progressively deflect and slow the flow of gas emerging from the barrel, so that by the time the gases emerge from the suppressor, the gas is cooler and at a lower velocity and silenced. However, this causes the suppressor to heat very rapidly and can create a mirage. "Mirage" refers to the phenomenon where heat waves in the air are visible and interfere with aiming the barrel. When these heat waves radiate from the barrel (or muzzle brake or suppressor), the heat distorts the image viewed through the sights or scope and interferes with the ability to aim the barrel.

Therefore, it is an object of this invention to take advantage of the expanding gases to reduce recoil.

It is another object of this invention to provide a suppressor that reduces heat so that barrel mirage is reduced while also assisting with reducing recoil.

SUMMARY OF THE INVENTION

The above objectives are accomplished by providing a muzzle brake that can be attachable connected to a weapon system having a barrel comprising: a housing; a front opening defined in the housing having a diameter generally the same size as the caliber of the barrel to which the housing can be attached; an impact plane included in the housing having an angle of incident greater than 90 degrees defined between the impact plane and the longitudinal axis of the housing; an eddy plane included in the housing having an angle of incident defined between the eddy plane and the longitudinal axis of the housing that is greater than the incident of angle of the impact plane; and, a concave surface included in the housing and carried by the eddy plane; a forward port defined by the impact plane, eddy plane and concave surface in the housing so that a portion of the gas expelled from the barrel is deflected outward from the housing upon contacting the impact plane and a portion of the gas expelled from the barrel is deflected by the concave surface producing eddies in the deflected gas stream.

The invention can include a plurality of ports defined in the housing each having a impact plane, eddy plane and concave surface. The concave surface can be adjacently connected to the eddy plane. Further, a mounting ring attached to the firearm having a female threaded portion; and; a male threaded portion connected to the muzzle brake so that the muzzle brake is removably attached to the rifle barrel using the threaded portions.

The muzzle brake can include an exterior sleeve encasing the barrel and defining a void between the barrel and the sleeve; filler material contained in the void; a mounting ring attached to the sleeve; and, a muzzle brake removable attached to the mounting ring having a housing, a front opening defined in the housing having a diameter generally the same size as the caliber of the firearm to which the housing is attached, an impact plane included in the housing, a eddy plane included in the housing, a concave surface included in the housing wherein the front plane, rear plane and concave surface define a port in the housing so that a portion of the gas expelled from the barrel is deflected outward from the housing.

The invention can include a housing have a front, middle and rear portion; a front impact plane including in the forward portion; a opening defined in the forward portion; a middle portion eddy plane included in the middle portion having a concave surface; an opening defined in the middle portion; a middle portion impact plane included in the middle portion; a rear portion eddy plane included in the rear portion having a rear portion concave surface; and, an opening defined in the rear portion. The invention can include a secondary concave surface included in the middle portion. The muzzle brake can include an opening defined in the middle portion and the opening defined in the rear portion have a diameter larger than the opening defined in the forward portion to better allow expelled gas out of the ports. The invention can include a deflection wall in the eddy plane. The invention can include a secondary concave plane included in the middle portion. The muzzle brake can include an opening defined in the middle portion and the opening defined in the rear portion have a diameter larger than the opening defined in the forward portion to better allow expelled gas out of the ports. The invention can include a deflection wall in the eddy plane.

The invention can include a housing having a void internal to the housing; filler material contained within the void; and, a plurality of sections contained in the housing having a space defined by a front wall and a rear well defining a baffle. The void can be defined by the interior of the housing and the exterior of a suppressor that that when the suppressor is placed in the housing the void is defined.

DESCRIPTION OF THE DRAWINGS

FIGS. 2C and 2D are illustrations of the structure of components of the present invention;
FIGS. 2E and 2F are perspective views of the invention.

DETAILED DESCRIPTION OF THE DRAWINGS

Figure 1:
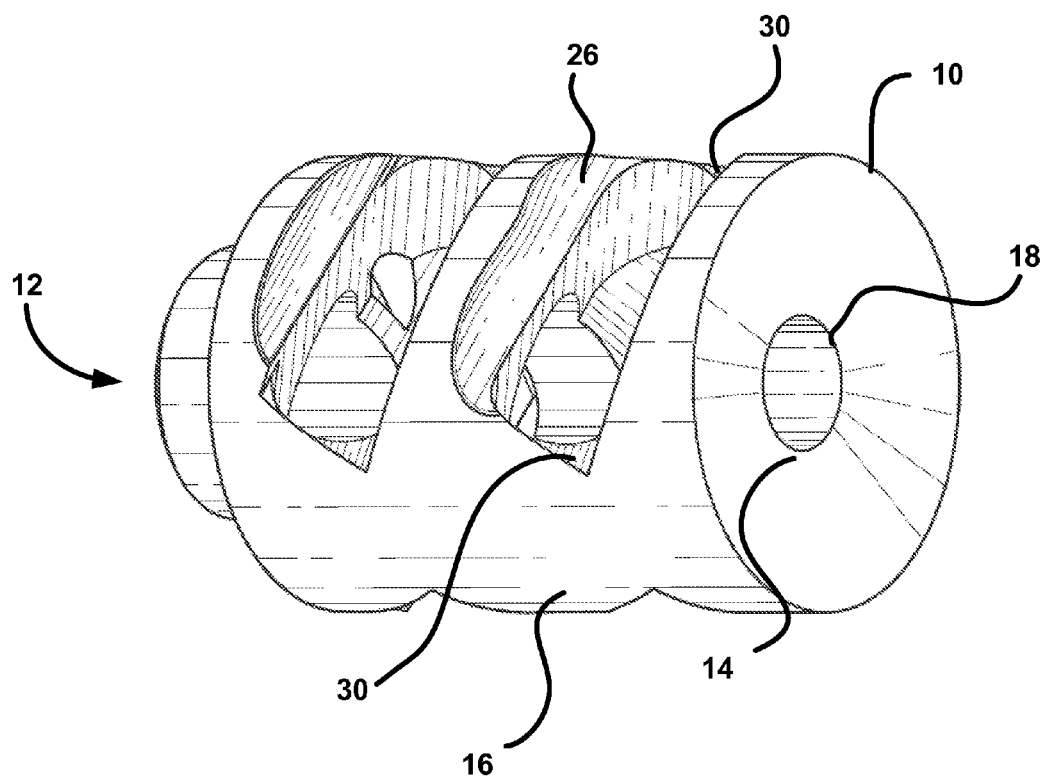
FIG. 1 is a perspective illustration of the invention.

Referring to FIG. 1, muzzle brake housing 10 has a forward port shown generally as 14 and defined in the housing. A rear port shown generally as 12 can also be included in the housing in combination with the forward port or alone and is also defined in the housing. In one embodiment, two forward ports are present on opposite sides of housing 16 and two rear ports are present. In one embodiment, the forward and rear ports are positioned on the left and right sides of the housing. The rear ports can be located in closer proximity to muzzle 18 than the forward ports.

Figure 2A:
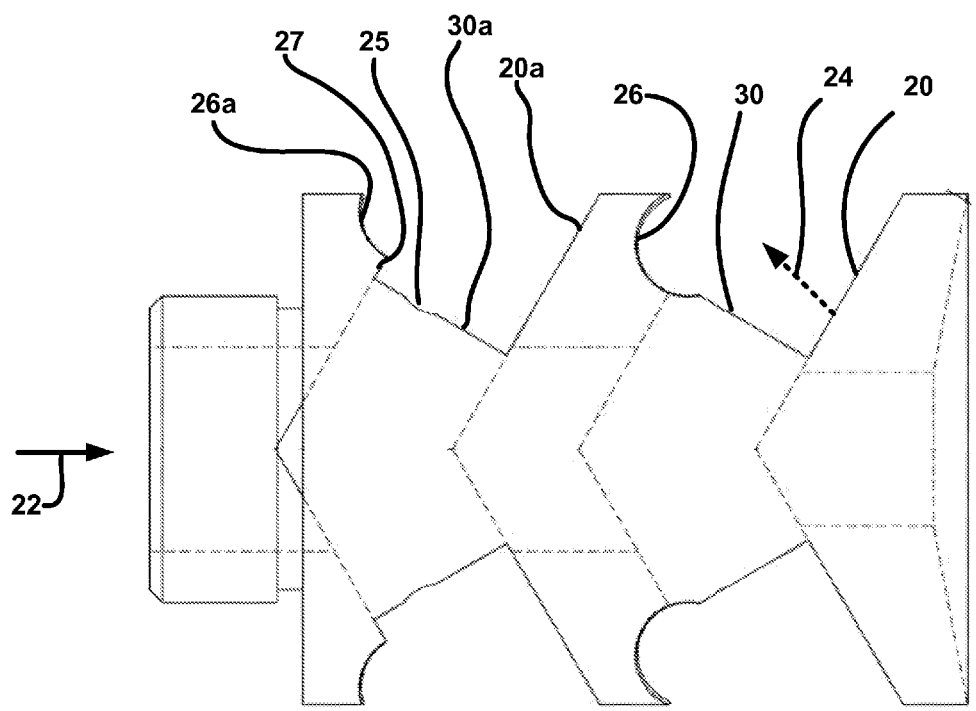
FIG. 2A is a cut-away illustration of the invention.

Referring to FIG. 2, a forward port impact plane 20 is included in the forward port. Some of the propellant gases traveling in direction 22 strikes the forward port impact plane and is deflected in direction 24. The forward impact plane is a planar surface defined in the housing shown in FIG. 2A. The forward impact plane is angled forward of a longitudinal axis of the housing and defines an opening along a lateral axis. These gases are further deflected by forward port eddy plane 30. The eddy plan is a planar surface shown adjacent to a concave surface and angled rearward along a longitudinal axis of the housing and defined an opening along a lateral axis. Some of these deflected gases are further deflected by a forward port concave surface 26 adjacent to the eddy plane.

Figure 2B:
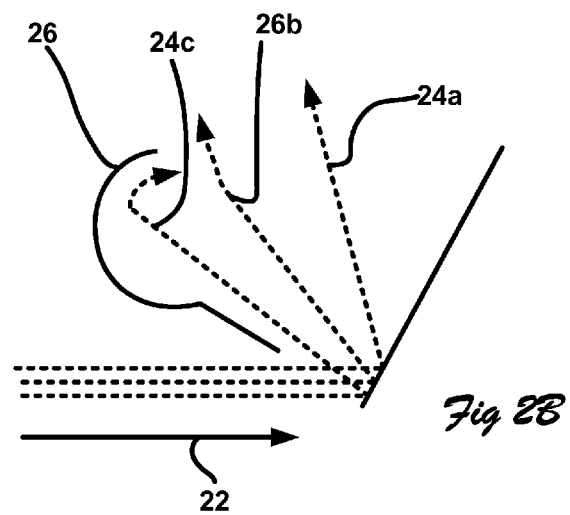
FIG. 2B is a side view of aspects of the invention.

Referring FIG. 2B, exhaust gas traveling in a direction 22 contacts impact plane 20. A portion of the exhaust gas is deflected in a direction shown as 24a. A portion of the gas is deflected in a direction shown a 24c and therefore contacts eddy plane 26 resulting in the deflected gas being deflected toward the impact plane. A portion of the gas travel in a path shown as 26b which is deflected by gas traveling on path 24c and eddies are created in the expelled gas stream. These eddies cause the expelled gas from the port to have a smaller disbursement area than muzzle brakes without the eddy plane.

In one embodiment, a rear port is included in the housing and includes a rear port impact plane 20a, a rear port eddy plane 30a, a concave surface 26a, a deflection wall 25 and secondary concave surface 27. In one embodiment, forward ports can be offset on the housing from said rear ports.

Referring to FIGS. 2C and 2D, the angle of incident between the eddy plane and longitudinal axis of the housing (θ") can be greater than the angle of incident between the impact plane and the longitudinal axis of the housing (θ'). In one embodiment, the angle between the impact plane and the longitudinal axis of the housing is greater than 90°.

Referring to FIG. 2E, the expanding gas is expelled through traditional muzzle brake ports into an area shown as 56. The angle between the inside area of the expelled gas area and the barrel is shown as 58. Referring to FIG. 2F, the present invention is shown where the eddy produced causes the expelled gases not to be projected as far rearward as with the traditional muzzle brake. With the present invention, the expelled gases occupy an area shown as 60. Therefore, this invention can reduce both the area of expelled gases as well as can result in a larger angle 62 better concentrating the expelled gas more perpendicular to the barrel thereby increasing the recoil reducing effect produced.

When two ports (or two pairs of ports) and included, gas that is not deflected by the rear port continues traveling in direction 22. Some of these gases can be deflected by the forward port increasing the effectiveness of the muzzle brake. In one embodiment, the rear port concave surface is recessed shallower than that of the forward port concave surface. In one embodiment, the secondary concave plane is recessed shallower than the rear port concave surface.

Figure 3:
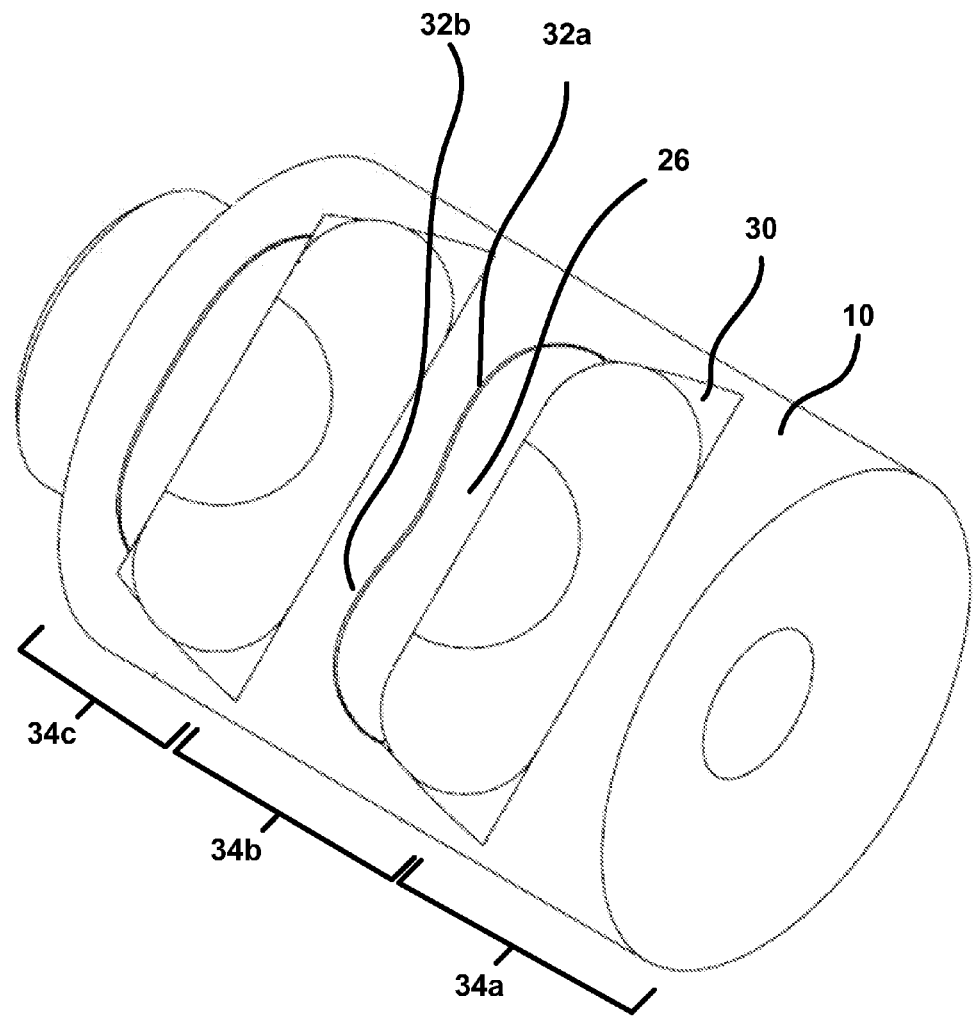
FIG. 3 is a perspective illustration of the invention.

Referring to FIG. 3, housing 10 includes forward port eddy plane 30 and forward port concave surface 26. Forward port concave surface is defined in the housing in one embodiment, the housing is cylindrical shaped. Therefore cutouts 32a and 32b are produced so that the forward port concave surface is defined with the housing.

Referring to FIG. 3, the housing is described as having three portions: a forward portion 34a, a middle portion 34b, and a rear portion 34c. The forward portion includes the front impact plane and an opening defined in said forward portion. The middle portion includes the forward port eddy plane, an opening defined in said middle portion and the rear port impact plane. The rear portion includes the rear portion eddy plane having a rear portion concave surface and an opening defined in the rear portion.

Figure 4:
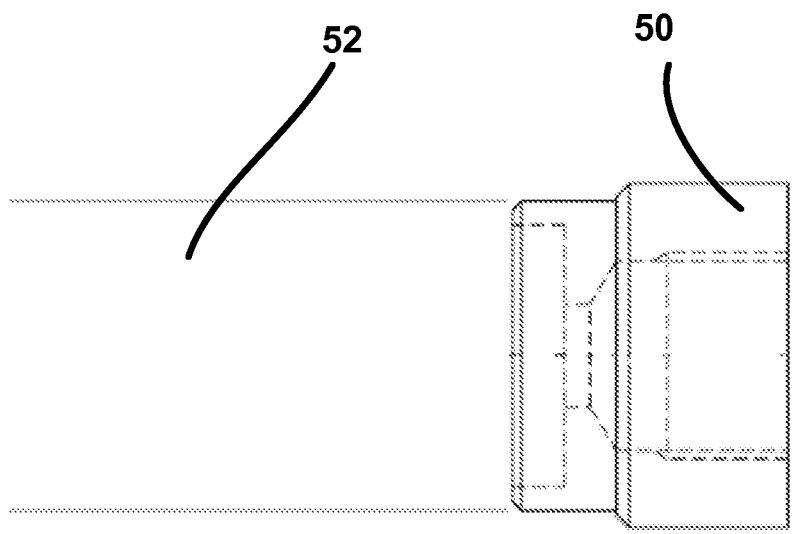
FIG. 4 is a cut-away illustration of the invention.

Referring to FIG. 4, a mounting ring 50 can be detachably connected to the housing. The mounting ring can be attached to barrel 54. The mounting ring can receive the housing thereby attaching the muzzle brake to the barrel. The connection between the muzzle connector and the barrel connector can be made using male and female threads, detent connection or through a more permanent connection such as a weld.

In one embodiment, the mounting ring is attached to the sleeve described in U.S. patent Ser. No. 12/774,402 ('402) filed May 5, 2010, titled Weapon System Construction and Modification and incorporated by reference. Paragraph [0032] in the '402 application states "a muzzle brake 60 can be installed after the sleeve and filler material have been installed." The muzzle brake can be installed through use of the mounting ring that is connected to the sleeve at the muzzle end of the modified barrel as described in the '402 application. Further, the filler material used in the '402 application can include adding ¼ to ⅓ by weight of graphite to the mixture described in paragraph [0031] of the '402 application. This additive provides for beneficial cooling properties to the modified barrel further reducing heat generated from the firing of the firearm of weapons system. This additive also reduces the weight of the filler material.

Figure 5A:
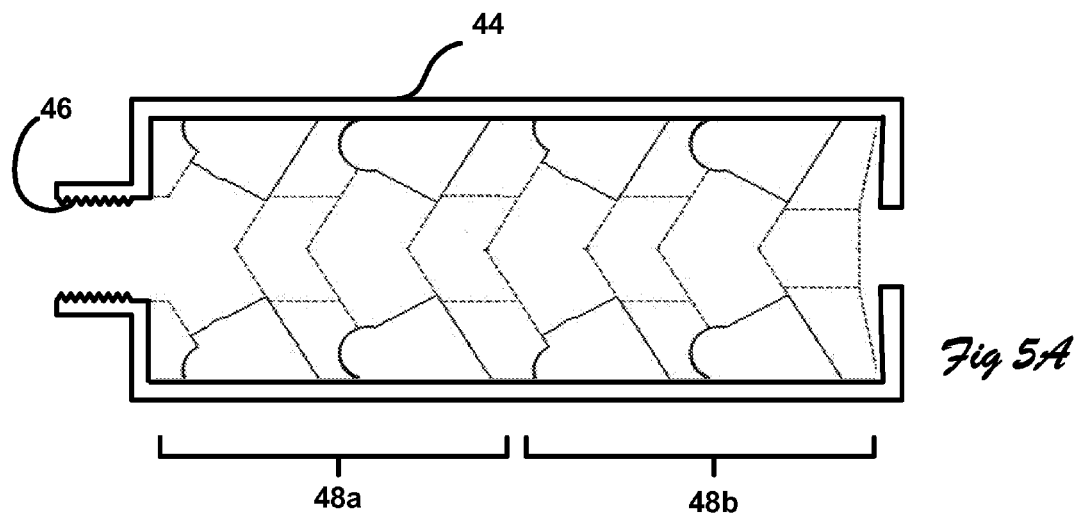
FIG. 5A is a side view cut-away view of the invention.
Figure 5B:
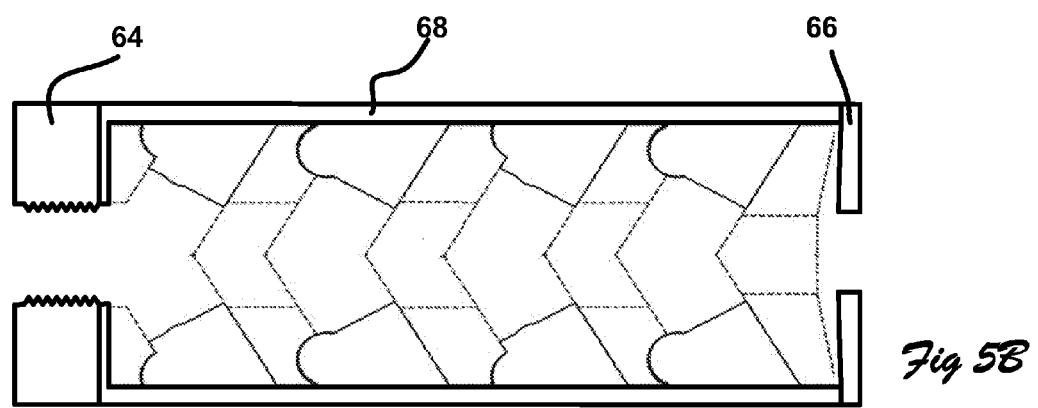
FIG. 5B is a side view cut-away view of the invention.

Referring FIG. 5A, the muzzle brake can be enclosed in sleeve 44 so that the forward ports and rear ports are encased. The muzzle brake will then act as a suppressor. The sleeve 44 can include a threaded portion so that the assemble can be attached to the muzzle end of a barrel. In one embodiment, several muzzle brakes can be included within the housing. For example, muzzle brake 48a and 48b can be included within a single housing. In one embodiment, housing 44 can include a removable rear cap 64 attachably connected to the housing for allowing access to the interior of the housing or removing the muzzle brakes. In one embodiment, housing 44 can include a removable front cap 66 attachably connected to the housing for allowing access to the interior of the housing or removing the muzzle brakes. In one embodiment, housing 44 can define a void 68 which can include filler material as described in the '402 application and further described herein.

Figure 6A:
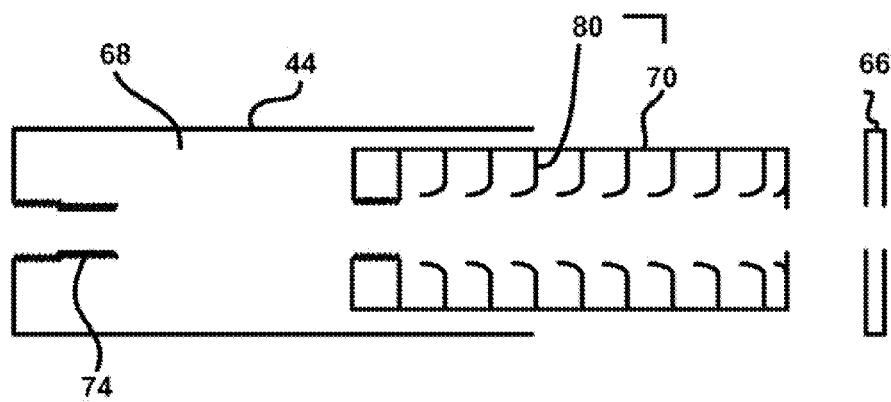
FIGS. 6A and 6B are side view cut-away views of the invention; and,
FIGS. 7A, 7B and 7C are side cut views of the invention

Referring to FIG. 6A, housing 44 includes a front cap 66. The housing is adapted to receive a traditional suppressor 70 having an outer casing. A void 68 (FIG. 6B) is defined in the space created between the outer casing of the traditional suppressor and the inner all of the housing. In one embodiment, a first set of threads 74 engages the threads on the existing suppressor to secure the traditional suppressor inside the housing. The housing includes a second set of threads 76 attached to the housing to connect the traditional suppressor to the barrel.

Figure 6B:
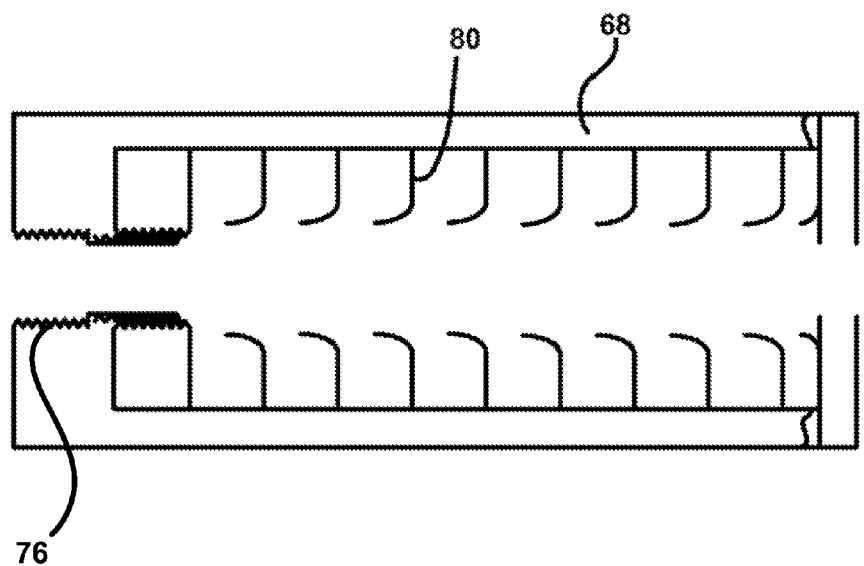

Referring to FIG. 6B, the traditional suppressor is contained within the housing and the front cap is attached. Void 68 is filled with the filler material described in the '402 patent and further described herein. The traditional suppressor can contain baffles 80. The front cap can be removed from the housing to allow access to the suppressor contained inside the housing. For example, some suppressors have a forward portion that can be removed providing access to the baffles. Removing the front cap from the housing allows the forward portion of the traditional suppressor to be removed providing access to the baffles for cleaning and the like.

In one embodiment, the housing has a rear cap that is attachably connected to the housing. In the event that the traditional suppressor contained with the housing is accessed from a rear portion of the traditional suppressor, the rear cap can be removed. This allows the rear portion of the traditional suppressor to be removed providing access to the interior of the suppressor and the baffles.

Figure 7A:
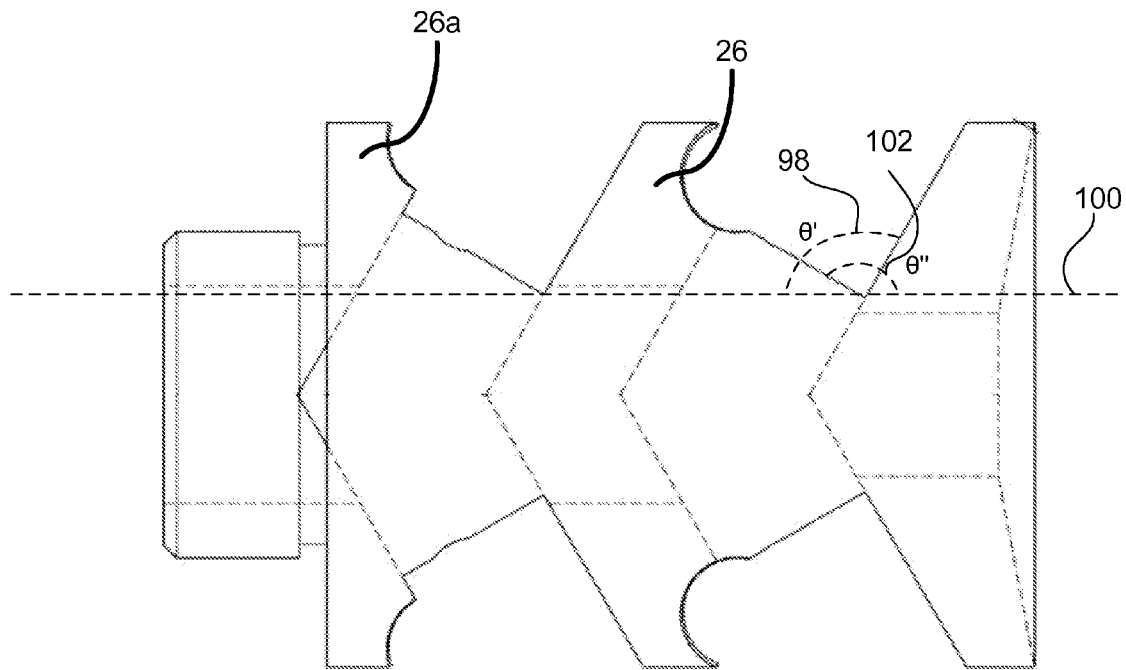
FIG. 7D is a perspective view of the invention.
Figure 7B:
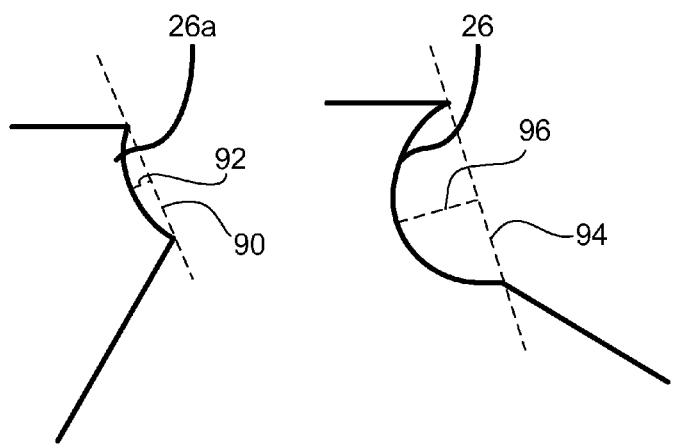

Referring to FIGS. 7A and 7B, secondary concave surface 26a can be included in the rear eddy plane and can have a recess shallower than the front port concave plane 26. A line 90 across the rim of the rear port concave surface defines a depth 92. A line 94 across the rim of the concave surface 26 defines a depth 96. As shown in FIG. 7B, the secondary concave surface 26a in the rear port includes a recess shallower than the front port concave surface 26a. Further, the angle of incident 98 relative of a longitudinal axis 100 of the forward impact plane can be less than the angle is incident 102 of the eddy plane.

Figure 7C:
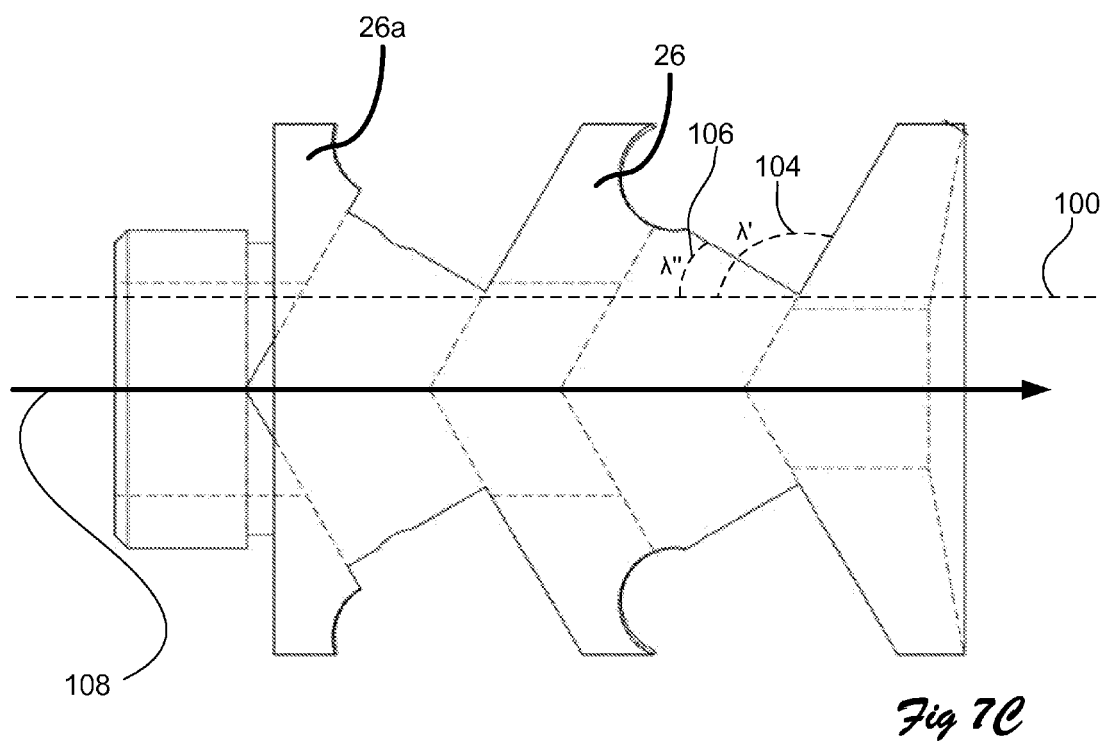
Figure 7D:
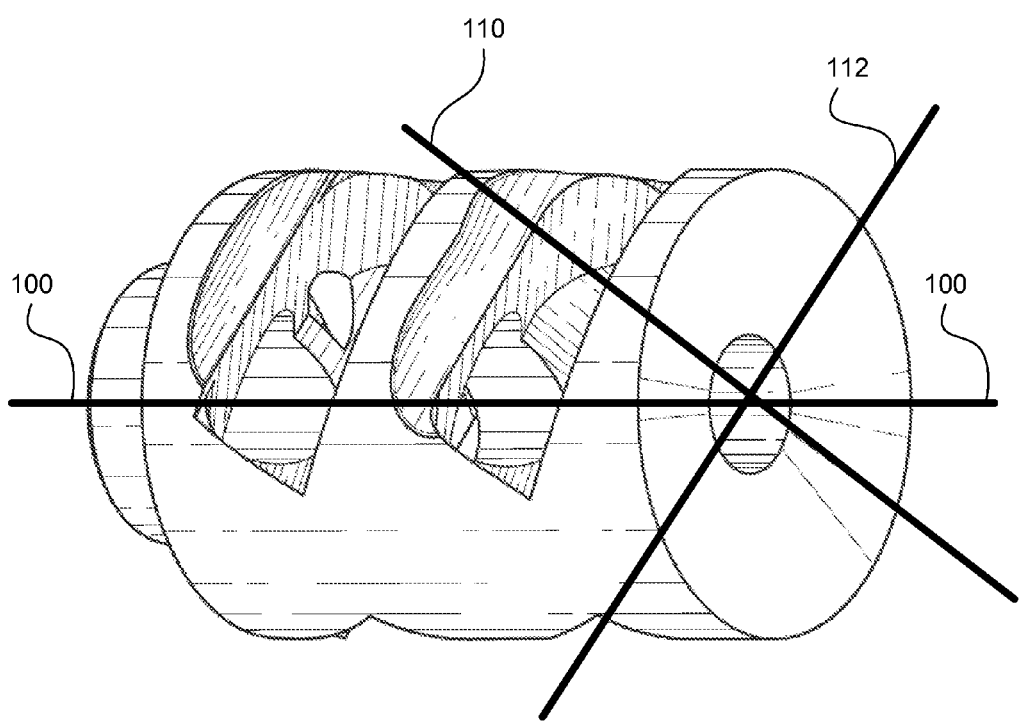

Referring to FIG. 7C, an opening angle (λ') 104 of the impact plane is shown. This angle is defined as the angle between the longitudinal axis 100 and the impact plane. Further, an opening angle (λ") 106 of the eddy plane is shown and defined as the angle between the longitudinal axis 100 and the eddy plane. From longitudinal axis 100 and opening toward the front port of the housing, the eddy plane defines an eddy plane opening angle λ" 106 which is less than 90°. From longitudinal axis 100 and opening toward the front port of the housing, the impact plane defines an eddy impact plane opening angle λ' 104 which is greater than 90°. Therefore, the impact plane causes gas traveling in a direction shown as 108 to have a reflection away from the longitudinal axis of the barrel along a lateral axis with a portion of the gas reflected toward a vertical axis. Further, some of the gases impacting the impact plane are reflected toward the eddy plane and are reflected along a lateral axis with a portion of the gas reflected toward a vertical axis away from the longitudinal axis of the barrel.

Referring to FIG. 7C, the invention is show having the longitudinal axis 100 which is in the direction of the bore. A lateral axis 110 is shown running along the port openings and bisects the invention through the ports into a top and bottom half. A vertical axis 112 is perpendicular to the longitudinal axis and bisects the invention into a left and right half. The left and right half defined by the vertical axis each include one of the ports.

While a preferred embodiment of the invention has been described using specific terms, such description is for illustrative purposes only, and it is to be understood that changes and variations may be made without departing from the spirit of scope of the following claims.

What is claimed is:

1. A muzzle brake that can be attachably connected to a weapon system having a barrel comprising:
   a housing;
   a front opening defined in said housing having a diameter about the same size as the caliber of the barrel to which said housing can be attached;
   an impact plane parallel to a vertical axis included in said housing wherein said impact plane includes an angle of incident greater than 90 degrees defined between said impact plane and a longitudinal axis of said housing;

an eddy plane parallel to said vertical axis included in said housing having an angle of incident defined between said eddy plane and said longitudinal axis of said housing that is greater than 0° and less than 90° and including an opening, wherein the eddy plane is slanted to face the impact plane and the impact plane and the eddy plane intersect; and, a concave surface included in said housing and adjacent said eddy plane and axised along said vertical axis;

a forward port defined by said impact plane, eddy plane and concave surface in said housing so that a portion of gas expelled from the barrel is deflected outward from said housing upon contacting said impact plane and a portion of gas expelled from the barrel is deflected by said concave surface producing eddies in the deflected gas stream.

2. The muzzle brake of claim 1 including a second port defined in said housing opposite said second port having an impact plane, eddy plane and concave surface wherein said forward and second port cause a portion of said expelled gas to travel along a lateral plane and a portion of said expelled gas to travel along a vertical plane.

3. The muzzle brake of claim 1 wherein said concave surface is adjacently connected to said eddy plane.

4. The muzzle brake of claim 1 including:
a mounting ring carried by the barrel having a female threaded portion; and;
a male threaded portion connected to said housing so that said housing is removably attached to the rifle barrel using said threaded portions.

5. A muzzle brake that can be attachably connected to a weapon system having a barrel comprising:
a housing adapted for being attachably connected to the barrel having a longitudinal axis;
a forward port defined in said housing by a forward port impact plane, a forward port eddy plane having an opening and a forward port concave surface and axised along a vertical axis, said forward impact plane having an angle of incident with said longitudinal axis of less than an eddy plane angle of incident relative to said longitudinal axis, wherein the eddy plane angle of incident relative to said longitudinal axis is greater than zero and the eddy plane is slanted to face the impact plane and the impact plane and the eddy plane intersect;
a rear port defined in said housing by a rear port impact plane, a rear port eddy plane and a rear port concave surface axised along said vertical axis; and,
wherein gas traveling down said barrel toward a muzzle is deflected by said forward port impact plane and said rear port impact plane upon reaching said muzzle brake and directed away from said housing by said forward port eddy plane and said rear port eddy plane thereby creating eddies in the air adjacent to said housing to interfere with the flow of gas exiting said muzzle brake.

6. The muzzle brake of claim 5 wherein said rear port concave surface has a recess shallower than the recess of said forward port concave surface.

7. The muzzle brake of claim 5 including a secondary concave surface included adjacent to said rear port eddy plane, axised along a vertical axis and having a recess shallower than said front port concave surface.

8. The muzzle brake of claim 5 wherein said forward port impact plane has an angle of incident greater than 90°.

9. The muzzle brake of claim 5 including a rear port deflection wall carried by said rear port eddy plane.

10. The muzzle brake of claim 5 including a rear opening in said housing having a diameter greater than the diameter of the bore of the barrel of the weapon system.

11. The muzzle brake of claim 5 including an opening in the rear of said housing having a diameter greater than the diameter of a front opening in said housing.

12. The muzzle brake of claim 5 including an opening in a forward portion of said housing having a diameter greater than the diameter of the bore of the barrel of the weapon system.

13. A muzzle brake that can be attachably connected to a weapon system having a barrel comprising:
a housing having a front, middle and rear portion;
a front impact plane included in said forward portion;
an impact opening angle greater than 90° defined by said front impact plane;
an opening defined in said forward portion;
a middle portion eddy plane included in said middle portion;
a middle portion concave surface included in said middle portion axised along a vertical axis;
an eddy opening angle greater than 0° and less than 90° defined by said middle portion eddy plane, wherein the middle portion eddy plane is slanted to face the front impact plane and the front impact plane and the middle portion eddy plane intersect;
an opening defined in said middle portion redirecting a portion of the expelled gas along a lateral axis and a portion along a vertical axis;
a middle portion impact plane included in said middle portion;
a rear portion eddy plane included in said rear portion;
a rear portion concave surface included in said rear portion axised along said vertical axis; and,
an opening defined in said rear portion.

14. The muzzle brake of claim 13 including a secondary concave surface included in said middle portion.

15. The muzzle brake of claim 13 wherein said opening defined in said middle portion and said opening defined in said rear portion each have a diameter larger than said opening defined in said forward portion.

16. The muzzle brake of claim 13 including a deflection wall included in said rear portion eddy plane.

17. A muzzle brake that can be attachably connected to a weapon system having a barrel comprising:
a housing having a longitudinal axis;
a front opening defined in said housing having a diameter about the same size as the caliber of the barrel to which said housing can be attached;
an impact plane included in said housing having an impact opening angle greater than 90°;
an eddy plane included in said housing having an eddy opening angle greater than 0° and less than 90°, wherein the eddy plane is slanted to face the impact plane and the impact plane and the eddy plane intersect;
a concave surface included in said housing and carried by said housing, adjacent to said eddy plane and axised along said vertical axis; and,
a forward port defined by said impact plane, eddy plane and concave surface in said housing so that a portion of gas expelled from the barrel is deflected outward from said housing upon contacting said impact plane and a portion of gas expelled from the barrel is deflected by said eddy plane and said concave plane producing eddies in the deflected gas stream.

18. The muzzle brake of claim 17 including:
a mounting ring carried by the barrel having a first threaded portion; and;
a second threaded portion connected to said housing so that said housing is removably attached to the rifle barrel using said threaded portions.

19. The muzzle brake of claim 17 wherein said impact plane includes an angle of incident greater than 90° defined between said impact plane and said longitudinal axis of said housing.

20. The muzzle brake of claim 19 wherein said eddy plane includes an angle of incident greater than said impact plane angle of incident.

21. The muzzle brake of claim 17 wherein said eddy plane includes an angle of incident greater than 90° defined between said eddy plane and said longitudinal axis of said housing.

\* \* \* \* \*